US008345665B2

(12) United States Patent
Vieri et al.

(10) Patent No.: US 8,345,665 B2
(45) Date of Patent: *Jan. 1, 2013

(54) TEXT TO SPEECH CONVERSION OF TEXT MESSAGES FROM MOBILE COMMUNICATION DEVICES

(75) Inventors: Riccardo Vieri, Montespertoli (IT); Flavio Vieri, Montespertoli (IT)

(73) Assignee: Apple Inc., Cupertino, CA (US)

( * ) Notice: Subject to any disclaimer, the term of this patent is extended or adjusted under 35 U.S.C. 154(b) by 516 days.

This patent is subject to a terminal disclaimer.

(21) Appl. No.: 12/628,693

(22) Filed: Dec. 1, 2009

(65) Prior Publication Data

US 2010/0076767 A1    Mar. 25, 2010

Related U.S. Application Data

(63) Continuation of application No. 11/858,775, filed on Sep. 20, 2007, now Pat. No. 7,649,877, which is a continuation of application No. 10/491,797, filed as application No. PCT/IT02/00673 on Oct. 21, 2002, now Pat. No. 7,310,329.

(30) Foreign Application Priority Data

Oct. 22, 2001 (IT) .................................. FI01A0199

(51) Int. Cl.
*H04L 12/66* (2006.01)
*H04M 11/00* (2006.01)
*G10L 13/08* (2006.01)

(52) U.S. Cl. ...................... 370/352; 379/88.14; 704/260

(58) Field of Classification Search ......................... None
See application file for complete search history.

(56) References Cited

U.S. PATENT DOCUMENTS

| 4,974,191 A | 11/1990 | Amirghodsi et al. |
| 5,128,672 A | 7/1992 | Kaehler |
| 5,282,265 A | 1/1994 | Rohra Suda et al. |
| 5,386,556 A | 1/1995 | Hedin et al. |
| 5,434,777 A | 7/1995 | Luciw |

(Continued)

FOREIGN PATENT DOCUMENTS

EP    1245023 A1    10/2002

(Continued)

OTHER PUBLICATIONS

Alfred App, 2011, http://www.alfredapp.conn/, 5 pages.

(Continued)

*Primary Examiner* — Chirag Shah
*Assistant Examiner* — Suk Jin Kang
(74) *Attorney, Agent, or Firm* — Morgan, Lewis & Bockius LLP (57) ABSTRACT

A method includes providing a user interface, at a mobile communication device, that includes a first area to receive text input and a second area to receive an identifier associated with an addressee device. The text input and the identifier are received via the user interface. A short message service (SMS) message including the text input is transmitted to a Text to Speech (TTS) server for conversion into an audio message and for transmission of the audio message to the addressee device associated with the identifier. An acknowledge message transmitted from the TTS server permits the addressee device to allow delivery of the audio message or to decline delivery of the audio message. The TTS server transmits the audio message in response to the addressee device allowing delivery of the audio message. A confirmation message is received from the TTS server that indicates that a reply voice message has been received from the addressee device in response to the audio message.

20 Claims, 5 Drawing Sheets

U.S. PATENT DOCUMENTS

| | | | |
|---|---|---|---|
| 5,479,488 A | 12/1995 | Lennig et al. |
| 5,577,241 A | 11/1996 | Spencer |
| 5,608,624 A | 3/1997 | Luciw |
| 5,682,539 A | 10/1997 | Conrad et al. |
| 5,727,950 A | 3/1998 | Cook et al. |
| 5,748,974 A | 5/1998 | Johnson |
| 5,794,050 A | 8/1998 | Dahlgren et al. |
| 5,826,261 A | 10/1998 | Spencer |
| 5,895,466 A | 4/1999 | Goldberg et al. |
| 5,899,972 A | 5/1999 | Miyazawa et al. |
| 5,915,249 A | 6/1999 | Spencer |
| 5,987,404 A | 11/1999 | Della Pietra et al. |
| 6,052,656 A | 4/2000 | Suda et al. |
| 6,081,750 A | 6/2000 | Hoffberg et al. |
| 6,088,731 A | 7/2000 | Kiraly et al. |
| 6,144,938 A | 11/2000 | Surace et al. |
| 6,188,999 B1 | 2/2001 | Moody |
| 6,233,559 B1 | 5/2001 | Balakrishnan |
| 6,334,103 B1 | 12/2001 | Surace et al. |
| 6,421,672 B1 | 7/2002 | McAllister et al. |
| 6,434,524 B1 | 8/2002 | Weber |
| 6,446,076 B1 | 9/2002 | Burkey et al. |
| 6,453,292 B2 | 9/2002 | Ramaswamy et al. |
| 6,499,013 B1 | 12/2002 | Weber |
| 6,501,937 B1 | 12/2002 | Ho et al. |
| 6,513,063 B1 | 1/2003 | Julia et al. |
| 6,523,061 B1 | 2/2003 | Halverson et al. |
| 6,526,395 B1 | 2/2003 | Morris |
| 6,532,444 B1 | 3/2003 | Weber |
| 6,598,039 B1 | 7/2003 | Livowsky |
| 6,601,026 B2 | 7/2003 | Appelt et al. |
| 6,615,172 B1 | 9/2003 | Bennett et al. |
| 6,633,846 B1 | 10/2003 | Bennett et al. |
| 6,650,735 B2 | 11/2003 | Burton et al. |
| 6,665,639 B2 | 12/2003 | Mozer et al. |
| 6,665,640 B1 | 12/2003 | Bennett et al. |
| 6,691,111 B2 | 2/2004 | Lazaridis et al. |
| 6,691,151 B1 | 2/2004 | Cheyer et al. |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,778,951 B1 | 8/2004 | Contractor |
| 6,792,082 B1 | 9/2004 | Levine |
| 6,807,574 B1 | 10/2004 | Partovi et al. |
| 6,810,379 B1 | 10/2004 | Vermeulen et al. |
| 6,832,194 B1 | 12/2004 | Mozer et al. |
| 6,842,767 B1 | 1/2005 | Partovi et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,928,614 B1 | 8/2005 | Everhart |
| 6,937,975 B1 | 8/2005 | Elworthy |
| 6,964,023 B2 | 11/2005 | Maes et al. |
| 6,980,949 B2 | 12/2005 | Ford |
| 6,996,531 B2 | 2/2006 | Korall et al. |
| 6,999,927 B2 | 2/2006 | Mozer et al. |
| 7,027,974 B1 | 4/2006 | Busch et al. |
| 7,036,128 B1 | 4/2006 | Julia et al. |
| 7,050,977 B1 | 5/2006 | Bennett |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,127,046 B1 | 10/2006 | Smith et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,177,798 B2 | 2/2007 | Hsu et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,904 B2 | 6/2007 | Luisi |
| 7,277,854 B2 | 10/2007 | Bennett et al. |
| 7,290,039 B1 | 10/2007 | Lisitsa et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,447,635 B1 | 11/2008 | Konopka et al. |
| 7,454,351 B2 | 11/2008 | Jeschke et al. |
| 7,475,010 B2 | 1/2009 | Chao |
| 7,483,894 B2 | 1/2009 | Cao |
| 7,487,089 B2 | 2/2009 | Mozer |
| 7,502,738 B2 | 3/2009 | Kennewick et al. |
| 7,523,108 B2 | 4/2009 | Cao |
| 7,526,466 B2 | 4/2009 | Au |
| 7,539,656 B2 | 5/2009 | Fratkina et al. |
| 7,546,382 B2 | 6/2009 | Healey et al. |
| 7,548,895 B2 | 6/2009 | Pulsipher |
| 7,555,431 B2 | 6/2009 | Bennett |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,267 B2 | 4/2010 | Lisitsa et al. |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,752,152 B2 | 7/2010 | Paek et al. |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,873,519 B2 | 1/2011 | Bennett |
| 7,873,654 B2 | 1/2011 | Bernard |
| 7,881,936 B2 | 2/2011 | Longé et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,930,168 B2 | 4/2011 | Weng et al. |
| 7,949,529 B2 | 5/2011 | Weider et al. |
| 7,974,844 B2 | 7/2011 | Sumita |
| 7,974,972 B2 | 7/2011 | Cao |
| 7,983,917 B2 | 7/2011 | Kennewick et al. |
| 7,983,997 B2 | 7/2011 | Allen et al. |
| 7,987,151 B2 | 7/2011 | Schott et al. |
| 8,000,453 B2 | 8/2011 | Cooper et al. |
| 8,005,679 B2 | 8/2011 | Jordan et al. |

| | | |
|---|---|---|
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,069,046 B2 | 11/2011 | Kennewick et al. |
| 8,073,681 B2 | 12/2011 | Baldwin et al. |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,165,886 B1 | 4/2012 | Gagnon et al. |
| 8,195,467 B2 | 6/2012 | Mozer et al. |
| 8,204,238 B2 | 6/2012 | Mozer |
| 2005/0071332 A1 | 3/2005 | Ortega et al. |
| 2005/0080625 A1 | 4/2005 | Bennett et al. |
| 2005/0119897 A1 | 6/2005 | Bennett et al. |
| 2006/0122834 A1 | 6/2006 | Bennett |
| 2006/0143007 A1 | 6/2006 | Koh et al. |
| 2007/0055529 A1 | 3/2007 | Kanevsky et al. |
| 2007/0088556 A1 | 4/2007 | Andrew |
| 2007/0100790 A1 | 5/2007 | Cheyer et al. |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0300878 A1 | 12/2008 | Bennett |
| 2009/0006343 A1 | 1/2009 | Platt et al. |
| 2009/0030800 A1 | 1/2009 | Grois |
| 2009/0058823 A1 | 3/2009 | Kocienda |
| 2009/0076796 A1 | 3/2009 | Daraselia |
| 2009/0100049 A1 | 4/2009 | Cao |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0299745 A1 | 12/2009 | Kennewick et al. |
| 2009/0299849 A1 | 12/2009 | Cao et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0131036 A1 | 6/2011 | Dicristo et al. |
| 2011/0131045 A1 | 6/2011 | Cristo et al. |
| 2011/0144999 A1 | 6/2011 | Jang et al. |
| 2011/0161076 A1 | 6/2011 | Davis et al. |
| 2011/0175810 A1 | 7/2011 | Markovic et al. |
| 2011/0184730 A1 | 7/2011 | LeBeau et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |

FOREIGN PATENT DOCUMENTS

| | | |
|---|---|---|
| JP | 06 019965 | 1/1994 |
| JP | 2001 125896 | 5/2001 |
| JP | 2002 024212 | 1/2002 |
| JP | 2009 036999 | 2/2009 |
| KR | 10-0776800 B1 | 11/2007 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10 2011 0113414 A | 10/2011 |
| WO | WO 2006/129967 A1 | 12/2006 |
| WO | WO 2011/088053 A2 | 7/2011 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MM, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D: Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., "Interactive Acquisition of Justifications: Learning "Why" by Being Told What" Knowledge Systems Laboratory, Stanford University, Oct. 1990, Technical Report KSL 9117, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al., "NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "SHADE: Technology for Knowledge-Based Collaborative Engineering," 1993, Journal of Concurrent Engineering: Applications and Research (CERA), 18 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

Rice, J., et al., "Monthly Program: Nov. 14, 1995," The San Francisco Bay Area Chapter of ACM SIGCHI, http://www.baychi.org/calendar/19951114/, 2 pages.

Rice, J., et al., "Using the Web Instead of a Window System," Knowledge Systems Laboratory, Stanford University, http://tomgruber.org/writing/ksl-95-69.pdf, 14 pages.

Rivlin, Z., et al., "Maestro: Conductor of Multimedia Analysis Technologies," 1999 SRI International, Communications of the Association for Computing Machinery (CACM), 7 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http://www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakToIt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.

YouTube, "Send Text, Listen to and Send E-Mail by Voice' www.voiceassist.com," 2:11 minute video uploaded to YouTube by VoiceAssist on Jul 30, 2009, http://www.youtube.com/watch?v=0tEU61nHHA4, 1 page.

YouTube, "Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

International Search Report and Written Opinion dated Nov. 29, 2011, received in International Application No. PCT/US2011/20861, which corresponds to U.S. Appl. No. 12/987,982, 15 pages. (Thomas Robert Gruber).

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

*Phoenix Solutions, Inc.* v. *West Interactive Corp.*, Document 40, Declaration of Christopher Schmandt Regarding the MIT Galaxy System dated Jul. 2, 2010, 162 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.

| Select the addressee the help call is directed to. Leave your telephone number in order to receive possible communications. | WRITE YOUR MESSAGE and make it heard on any telephone in the world! |
|---|---|
| Addressee No.  police113<br><br>Sender No.  064554 | I'm home alone and I'm afraid that burglars are inside. Help me, I'm at 15, via Rossi in Florence<br><br>Enter |

FIG. 4A

| Enter the telephone number you want to send the message to: Leave also your telephone number in order to receive possible communications. | WRITE YOUR MESSAGE and make it heard on any telephone in the world! |
|---|---|
| Addressee No.  05514234<br><br>Sender No.  3351411 | Hi, I'm Rossi Marco, I read your ad and I'm interested in the job you offer. I would like to work with you. The e-mail address found on the web is wrong and I'm abroad at the moment. Could you please contact me at the number 351411<br><br>Enter |

FIG. 4B

| Enter the nickname of the person you want to send the message. Leave your nickname in order to receive possible communications. Select the language you want the message to be heard in. <br><br> Addressee No.  [Misscuba] <br><br> Sender No.  [Italia12] <br><br> Language  [inglese] | WRITE YOUR MESSAGE and make it heard on any telephone in the world! <br><br> Hi I am an Italian boy and I live in Florence. Would you like to visit me next summer? My nickname is Italia12. <br><br> [Enter] |

FIG. 4C

| Enter the telephone number you want to send the message to: Leave also your telephone number in order to receive possible communications. <br><br> Addressee No.  [065434] <br><br> Sender No.  [064554] | WRITE YOUR MESSAGE and make it heard on any telephone in the world! <br><br> Hello Monica. I know you're at home, I'm late and I've finished the money on my telephone card. I'll come for you at nine. See you later. Adriano. <br><br> [Enter] |

TEXT TO SPEECH CONVERSION OF TEXT MESSAGES FROM MOBILE COMMUNICATION DEVICES

CLAIM OF PRIORITY

This application is a Continuation patent application of and claims priority from U.S. patent application Ser. No. 11/858,775, entitled "MOBILE DEVICE FOR SENDING TEXT MESSAGES", filed on Sep. 20, 2007, which claims priority from U.S. patent application Ser. No. 10/491,797, entitled "SYSTEM FOR SENDING TEXT MESSAGES CONVERTED INTO SPEECH THROUGH AN INTERNET CONNECTION TO A TELEPHONE AND METHOD FOR RUNNING IT", filed on Apr. 6, 2004, which claims priority from PCT application PCT/IT02/00673 filed on Oct. 21, 2002 and from Italian Patent Application No. 2001FI00199 filed on Oct. 22, 2001, each of which is incorporated herein by reference in its entirety.

BACKGROUND

Different systems use the Internet as a means of transferring data, but such systems are typically not capable of sending text messages from the Internet and converting them into vocal messages on a telephone line.

By means of an IP connection it is possible to download songs, to telephone, to send e-mail messages, and to send SMS messages.

The most common peripheral unit, available for everyone, to be connected to the Internet is the modem. This word is a mixture of two words, modulator and demodulator. The function of a modem is to convert digital data in the form of electric pulses into a form that can be used for transmission on normal telephone lines. Therefore, the modem converts electric signals coming from the computer into sounds and permits their transmission by means of the telephone line. The receiving modem makes the opposite operation: as soon as it receives the sounds from the telephone line, it reconverts them into electric signals in order to make them available to the computer it is connected to. This further operation is called demodulation. Technical evolutions of modems include new peripheral units and digital platforms that send data on a suitably shaped line without any need to convert them into sounds, such as ISDN data transmitting cards. Another resource available to users is the DSL connection. Using this system it is possible to divide the vocal transmission from the data transmission by using particular filters.

Also referring to Internet connections, another available technology for users is the system of connection by satellites. Thanks to these systems even people who are not experts at hardware and software can surf on the Internet, send e-mail messages, send SMS messages, and send and receive fax and other related operations. By means of data transmitting cards, permitting the transmission of complex data in audio and even video forms, also called technological platforms, many companies develop more and more complex programs and applications in order to provide firms with ancillary services.

One of the easiest ways to send communications with a telephone, using the Internet, is writing SMS messages. For this purpose, the user fills in a form on the web writing a text message and sends it to a server/gateway that transfers it to the mobile number the message is directed to.

However, this means of communication has some drawbacks. SMS messages are short and the communication reaches almost exclusively the users of the country where the portal works. In addition, these SMS messages reach neither cordless phones not using the GSM system nor common house telephones. The communication that reaches the final destination is mainly textual, in the form of a message that can be read on a display, not vocal. Another important characteristic is that users cannot verify immediately the result of the SMS message sent on-line.

"Text-to-speech" (TTS) technology exists, which permits some interactions via internet/telephone. By these means, an Internet/telephone service where TTS is in use allows a service subscriber to receive a notification that a message has arrived on the phone or a notification to dial a telephone number and listen to the message in the form of speech. Nevertheless, this system is not convenient, as it needs registrations, and is limited and not easy to be used by an inexpert user. The TTS technology principally reads text and converts the text to speech. TTS technology has been useful for teaching, utility and support purposes, in particular for those who are disabled and blind, but as regards to its use with telephone interactions, it is mostly based on "inbound" applications, i.e., centered in order to support inbound and not outbound communications. Vocal tree menus are an example and are used by companies in order to automatically provide a caller with information.

Other systems permitting communication by voice with another user via the Internet also exist. But with the traditional methods, people holding a single telephone line cannot communicate by voice in a simple and comfortable way through the computer with another telephone. In fact, in order to make a call using the Internet, the user needs software, loudspeakers and microphones. An Internet user is not able to send text messages to the designated telephones, except for the messages appearing on the display of the phone.

Also, e-mails, the most widespread means of communication via the web, cannot give guaranties about the correct receipt of the communication by the addressee. As a matter of fact, a simple automatic acknowledge transmission of the e-mail by the addressee to the sender is not sufficient to say he/she has entirely read the communication or understood its meaning.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
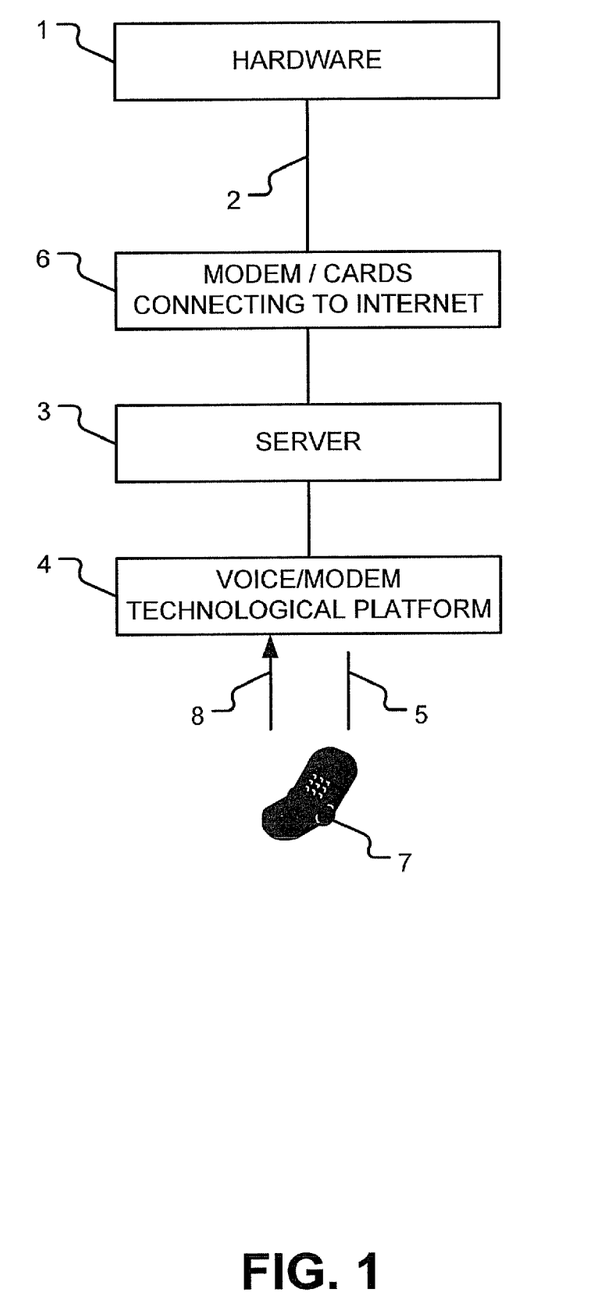
FIG. 1 is a general diagram that illustrates elements of a communication system.

FIG. 1 shows a system that includes hardware (1), used by the user for writing messages and sending them; a connection to Internet (2), by a modem (6) or ISDN connecting card, net card or alternative systems connecting to Internet; a server (3) where a software is installed, directing the various functions and changes text messages into speech, sending them by means of voice modem and/or technological platforms for transmitting vocal data (4) by a telephone line (5) to a telephone (7) of the addressee of the communication. The addressee, if he wishes, can interact with the vocal message received by using a keyboard or a keypad associated with the telephone (7) or by speaking into the telephone. This possible interaction will be sent (8) on the server and filed for the sender who can then read and/or listen to it.

The text written by a user, by an IP connection, gets to a server, where it is converted into speech and sent to a telephone number by a telephone line. The entire executing process is then saved on a file that can be read by means of an IP connection. This system involves hardware, data transmission systems, telephone lines, specialized software, receiving apparatus and many technical details.

Figure 2:
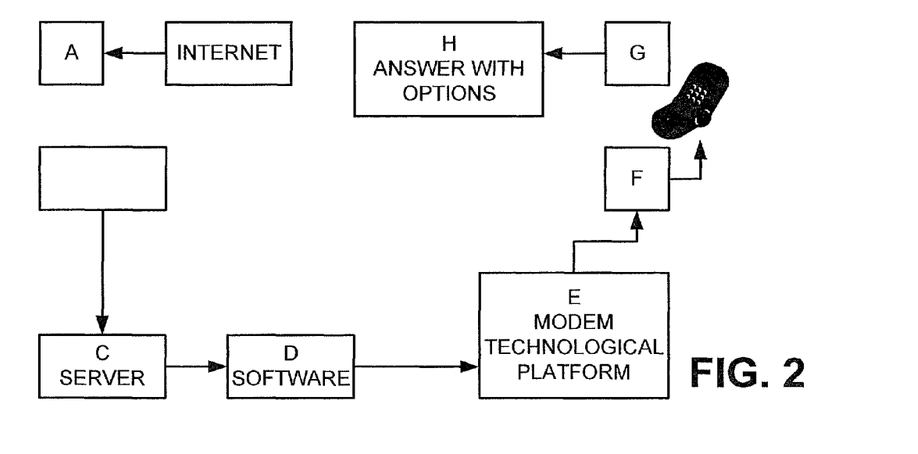
FIG. 2 is a general diagram that illustrates operation of the system of FIG. 1.

Referring to FIG. 2, a flowchart shows the steps of the system in the case that the user uses a form found on the Internet. On a web page, the user can find a form to write text. This form may contain several details. The user writes a message (B) and presses enter to send the message to the server (C). The server receives the message, encodes it using software (D), such as a "voice engine", and changes the text into speech using text-to-speech (TTS) technology. The telephone number of the addressee is received by the software that is configured to send the communication by means of a peripheral, such as a voice modem and/or a technological platform (E). The peripheral sends the message to the addressee by a normal telephone line (F). The addressee receives the communication, which was originally sent in the faun of text and then converted into speech. In addition, the addressee (G) can interact with the caller, using the keyboard, by the DTMF system or directly via the microphone of the telephone. So doing, he can answer questions and/or send communications that will be saved in log files available for data analysis and decoding.

Figure 3:
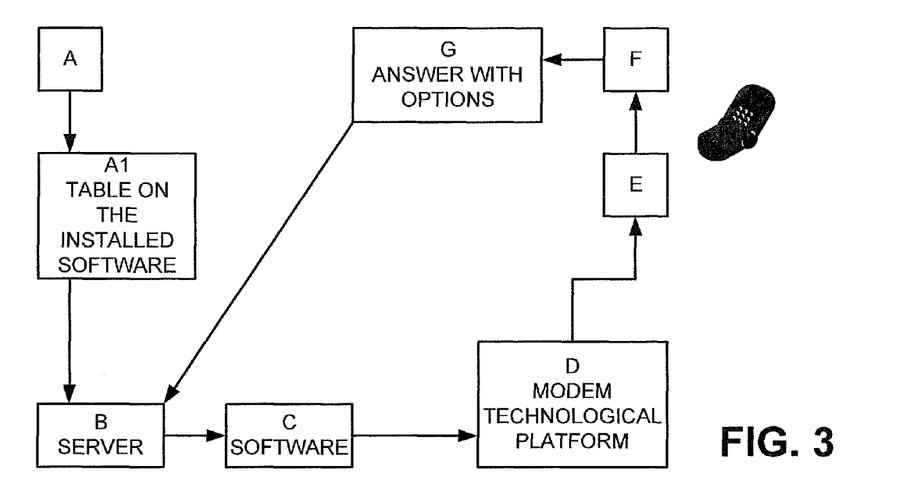
FIG. 3 is a general diagram that illustrates operation of the system of FIG. 1.

Referring to FIG. 3, a flowchart briefly shows the action of the Internet user in the case that he has downloaded software to run the system. The Internet surfer (A) writes the message (A1) directly into a table of the software installed on his/her hardware, without using a form on-line as in the previous case. The communication starts and gets to the web server (B) that records it. The software (C) changes the text into speech and, by means of a voice modem (D) and/or other data transmitting/receiving cards, sends it to the designated number by a telephone line (E). The communication reaches the addressee's telephone (F). The addressee has the possibility of answering with various options (G). For this system, the surfer uses software specifically provided, connects to the Internet, writes a message via the software interface, sends it to a web server, which converts it into speech by means of sophisticated software, and sends the communication to the addressee. By means of the software, the user can also send pre-recorded communications filed at the server.

Figure 4A:
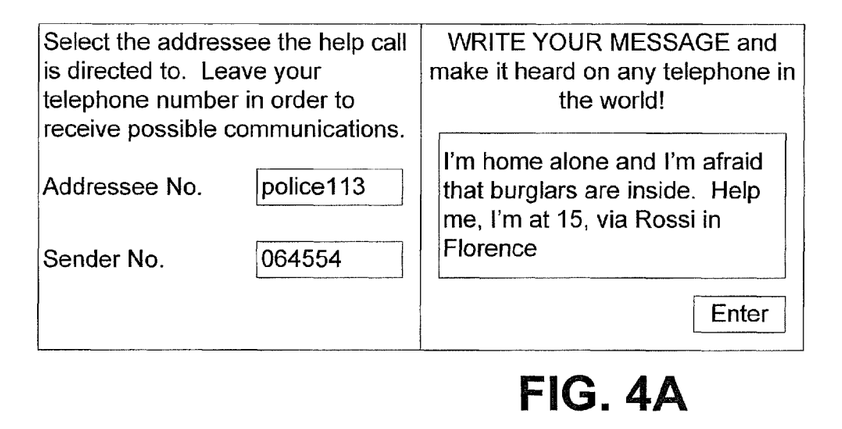
FIG. 4A illustrates a display that may be used to send an emergency message.
Figure 4B:
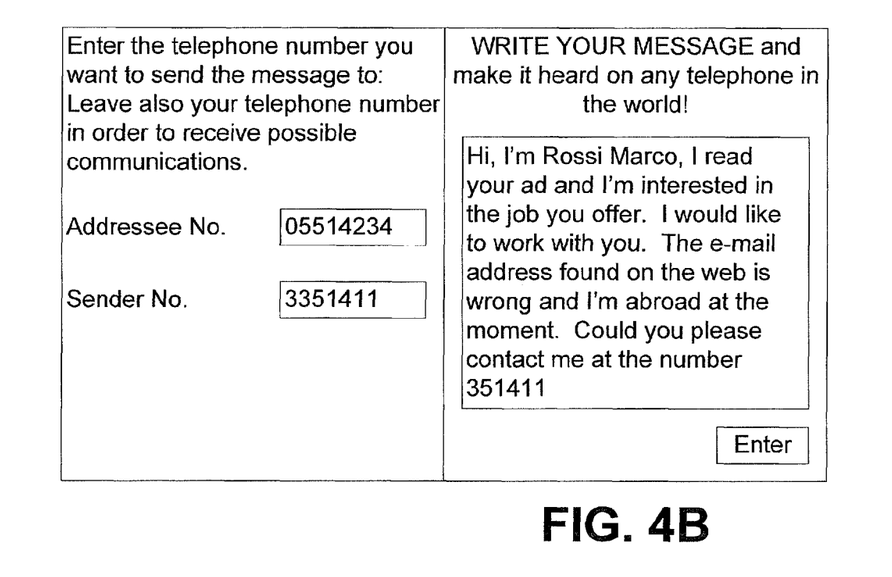
FIG. 4B illustrates a display that may be used to send a job related message.
Figure 4C:
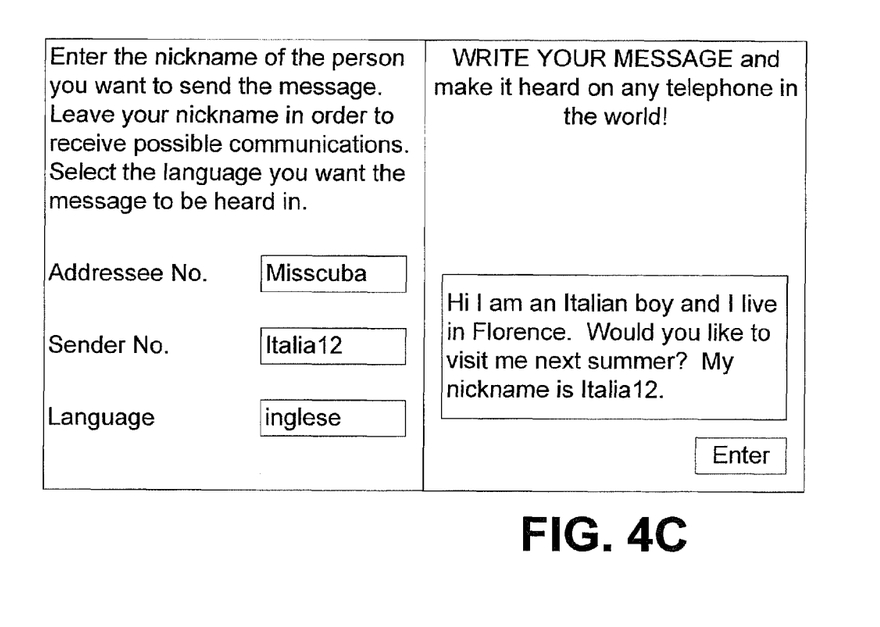
FIG. 4C illustrates a display that may be used to send a message to a new friend.
Figure 4D:
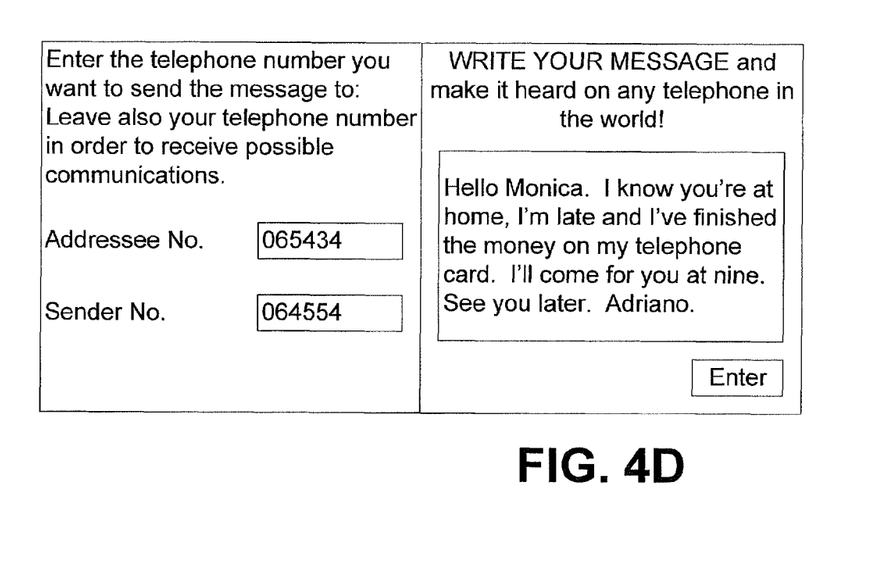
FIG. 4D illustrates a display that may be used to communicate.

FIGS. 4A, 4B, 4C, 4D schematically show how the user can write a message and send it. In particular, they describe some practical examples. In these examples, it is possible to send and/or receive the communication to and/or from an alias as well as to a telephone number. Additionally, it is possible to send/or receive the communication in a desired language. In particular, FIG. 4A shows the system used for social utility or emergency cases; FIG. 4B shows the system used to look for a job; FIG. 4C shows the system used to look for new friends; FIG. 4D shows the system for everyday use. These illustrated examples are simply practical examples but are not to be considered restrictive.

Figure 5:
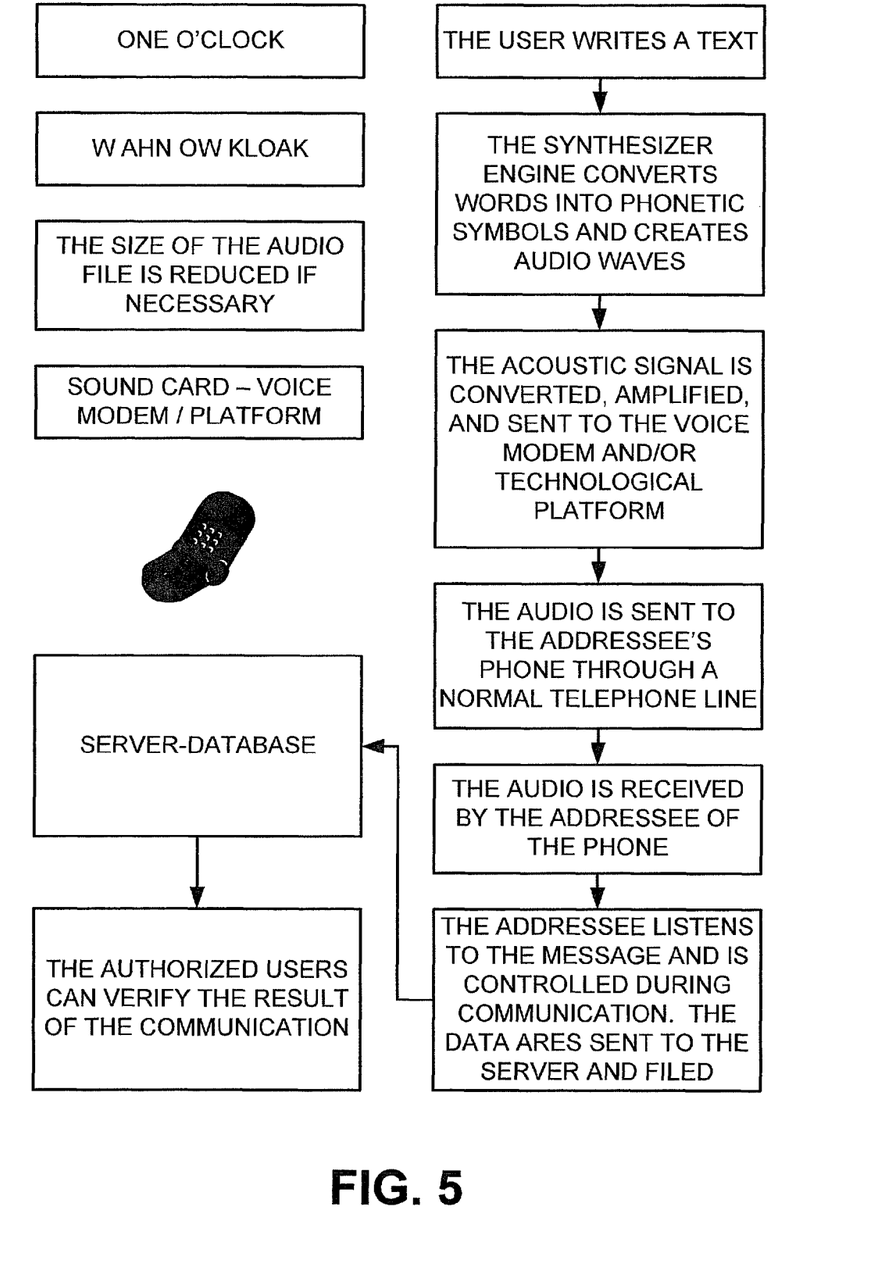
FIG. 5 is a general flow diagram to illustrate a method of communicating.

FIG. 5 is a flowchart that describes a system showing how the text-to-speech (TTS) technology works in a particular case. Using TTS technology, words and text are fragmented into phonemes and are analyzed by characters, figures, sums, inflections and punctuation. The final result is an audio form.

The system and method of the present disclosure allows Internet surfers, or more generally users that have a modem and/or even a more developed analog or digital card transmitting and receiving data, to be able to write a text on a form found on the web site and/or by means of an interface downloaded from software, to send this message to a telephone number and make it known to the addressee in real time and/or by pre-recording. This system also constitutes a valid alternative to communicate vocally with another person with a single telephone line simply by writing a text, with no need of loudspeakers and microphones or subscriptions to services permitting calling via the Internet.

This disclosure aims at transmitting on a common telephone vocal messages obtained by the conversion of text messages written by the user and sent via the Internet.

In a particular embodiment, a system of the present disclosure involves use of hardware and software devices, telematic instruments and systems for the transmission of data, which together allow the receipt of a vocal message sent originally by the Internet in the form of text.

In a particular embodiment, the system for sending text messages converted into speech comprises: means to write and send messages, by a data input device including hardware showing a table where users can write a text message and/or order the transmission of a pre-recorded message, indicate the telephone number(s) of the addressee or a database where addressees' telephone numbers can be found, and send it to a server; means to connect the data input device with the server, including a connection to the Internet by modem, data transmitting and receiving cards, similar apparatus or kits for satellite connection; means to receive and process the text message, by the server, where a program is installed that is able to convert the text message into a vocal message and set it up for transmission on the phone, and comprising other applications capable of controlling and filing the data relative to the entire telephone transaction; means to transmit the vocal message on the telephone line by a voice modem or other technological peripherals for the transmission of at least vocal data; and means to receive the message, including a common phone.

Conveniently, it is possible to reply to the vocal messages received by means of a suitable keyboard connected to the phone using DTMF keys and tones. Conveniently, the addressee can send a reply vocal message to the sender, so that it is then filed on the server.

Conveniently, on the computer through which data is input, software is installed, which permits the transmission of text messages by modem, or otherwise. The computer can also include digital and/or analog cards for transmitting and receiving pre-recorded communications. The software program installed by the user may be represented by an icon within the browser, in case the user is surfing on the Internet or is not using it at that particular moment.

Conveniently, on the computer through which data is input, there is a table, either created by installed software or an HTML form or similar form, which comprises a suitable interface used to write a message and send the message to the server carrying out the transaction until the message reaches its destination. By this interface, the user can write many messages to various people and send them by means of an automatic connection to the Internet.

The table is also used to send pre-recorded communications loaded on an external server to various addressees and at specific hours.

Conveniently, the table through which messages are written includes an area for an optional input of the sender's telephone number or his/her "alias" or nickname.

Conveniently, the table through which messages are written includes an area for the necessary input of the addressee's telephone number or his/her "alias" or nickname.

Conveniently, the table through which messages are written includes an area for the input of the language the user wants to use to send the message to the designated telephone number. Conveniently, the table through which messages are written includes an area for the selection of the pre-recorded message to send.

The system permits the transmission from the web of both text and pre-recorded messages in different forms, thanks to a system for compressing and converting data. Nowadays, the transmission of pre-recorded messages for telemarketing campaigns and the conversion of the text into speech have some technical limits. Particularly recorded messages converted into files often take such wide dimensions that they are not easy to send to the addressee. In addition, the "voice engines", which are the engines that change the text into speech, cannot be easily used, as they need a computer background on operating systems and the small amount of information available cannot be easily understood by all users.

Conveniently, the audio messages registered in professional forms, as well as the text files for the conversion in audio using "text-to-speech" technology, are converted into smaller files and sent to the addressee simply using voice modems and not necessarily sophisticated data transmitting cards. As a matter of fact, files that are too large would not allow the telephone message to be transmitted immediately. The user on the phone could wait several minutes before receiving the communication and could hang up. The larger the file to send is, the longer the wait may be. The system of the present disclosure avoids this drawback thanks to particular technical solutions: first, inserting an initial immediate "beep", starting when the receiver is connected, which allows the addressee to hear a signal and hold it waiting, in case he needs less time to listen to the communication; second, converting the forms into automatically smaller files, thanks to a particular system for the compression of audio files, which makes them in an average mono quality, sufficient for the reception level of the phone; and third, is the possibility to insert at the beginning of the call a "confirmation file", i.e., an acknowledge vocal message, which causes the user to interact with the telephone keyboard for listening or declining the arriving communication.

Conveniently, the text communication can be addressed to an "alias" and not to a particular telephone number. The server will be able to identify the alias and connect the communication to a specific telephone number, providing the privacy of the users.

This system also allows all users, under authorization, to use the most applications and functions available, thanks to the database on the web server. An Internet user, with his/her password, will be able to send various communications to various addressees, simply by indicating the required preferences.

Conveniently, the server holds a file archive with a database and multiple support that allows authorized users to import files with telephone numbers, write a text or retrieve pre-recorded messages, record them in a different audio form, send them to the addressees, and file everything on the server database, all using a simple connection to the Internet, without particular programs or the help of experts in this field.

Conveniently, the users will be able to write simple messages and send them with synthesized voices and possibly real voices and with an image, chosen among figures at pleasure, like robots, actors, singers, football players and other. With a simple photo and a nickname of the addressee, it is possible to send him/her a communication on the phone without knowing his/her number, and also relations between foreign companies might develop thanks to the possibility of a translator that converts the text into the desired language and sends it to the addressee. Anyone that has difficulties in speaking will have a new means of communication. People can talk together saving time and money, because operational and telephone costs will be covered by sponsors and advertising. New jobs related to services, information and public utility will be created.

Conveniently, the table through which messages are written includes an area for the insertion of the time and date to send the message.

Conveniently, the table through which messages are written includes an area for the selection of the tone of voice to use to send the message. Conveniently, the table through which messages are written includes an area for the selection of the transmission and/or reception of the messages to several telephone numbers.

Conveniently, the table through which messages are written includes an area for the selection of an automatic repeat of the number, in case the number called is engaged and/or free but without answer, choosing how many calls to try.

Conveniently, the table through which messages are written includes an area permitting to decide that in case there is an answering machine and/or a call transfer, the message can be transmitted anyway.

Conveniently, the user can send and/or receive the communication anywhere and to any telephone number. Conveniently, this system allows the user to receive an acknowledgement of the receiving message by e-mail or a message on the phone.

Conveniently, this system permits monitoring of every call made by the user, and the relative results are filed, so that the user can later verify and check the history of the message. Conveniently, the user has a password in order to send and/or receive the communication and is authorized to send and/or receive the communication as the server automatically detects it.

Conveniently, the user is authorized by an identification system to use the database and the functions of the system found on the web server and, thanks to the program installed on the server, can import data onto his hardware, input them on the server database, make operations in order to send messages to several addressees, select pre-recorded messages, select options, times and dates, and file and save data on the server.

Conveniently, the data transmission for the outbound calls is not performed via cable, but through an analog or digital telephone line.

Conveniently, this system permits a user to send and/or receive communications in real time and/or pre-recorded messages filed on the server in such a form suitable to be received by the addressee.

With regards to the reception, the addressee of the message can interact through telephone, using the keyboard or answering the message by voice. The server registers the answers and/or interactions left by the addressee, so that the sender, by means of a specific interface, can connect to the server, decode the meaning of the DTMF tones and/or listen to the vocal messages left by the addressee.

Conveniently, writing a text inside a banner and/or form, the user can send and/or receive a pre-recorded communication with the initial and/or final addition of the written text converted into speech.

Conveniently, an acoustic signal is transmitted as soon as there is a telephone connection with the addressee, avoiding immediate disconnection in case of a brief waiting period before the transmission of the communication.

Conveniently, if the transmitting file is too large, it is automatically converted and reduced to such an extent that the addressee can correctly receive it.

A method to convert text messages into vocal messages and send them by telephone line is disclosed and is characterized in that it comprises the following steps: decoding of the text received by the user; conversion of the text into speech; extension of the size of the vocal file created; adjustment of the vocal message in such a form to be read by the data transmitting card; interaction with the transmitting card; dialing of the number(s) indicated; transmission of the message on the phone; recording of the data of the telephone call and filing of the data on a server database; and during conversion, compress the file if wider and not suitable for a perfect transmission.

This method creates more audio files that are arranged by number and sent, following the order of configuration, all together in the same telephone call, to allow the addressee to listen on the phone to several vocal messages arranged in order but included in a single call.

Conveniently, the first stage of conversion of words is called "standardization of the text", the second stage is the "standardization of the pronunciation", the third stage is the pronunciation itself that puts in order more phonemes. Specific algorithms are used in order to fragment words and find the sound produced by a specific letter. The last stage of this process is the "prosody", which is the speed of reading, with possible pauses and other details for the perfection of the audio. At this stage, the voice modem and/or a technological platform converts the text to voice.

The possibility to send long and wide text messages, later converted into vocal messages, to telephone numbers all around the world, permits a user to send easily and rapidly any kind of communication, no matter the length of the text. This operation can reduce costs and gives the sender a better assurance than previous systems, permitting a complete confirmation of the receipt by the addressee.

This acknowledgment is much more complete using the system of the present disclosure, which permits a user to check the complete or partial receipt of the communication, registering the opinions and interactions of the addressee. The system of the present disclosure has other advantages: for example, it allows people who have problems with communication, e.g., autistic, deaf and dumb, to communicate vocally on the phone with anyone without using their own voice, sending messages, help calls and other services by phone, so that the written text arrives to the addressee in the form of speech. Another application of this disclosure is to translate the text in any language by means of a simultaneous translator that changes the written text into the desired language and sends it to the addressee in the form of speech.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer-readable storage medium comprising instructions that, when executed by a processor, cause the processor to:

provide a user interface at a mobile communication device, the user interface including a first area to receive text input and a second area to receive an identifier associated with an addressee device;

receive the text input and the identifier via the user interface;

transmit a short message service (SMS) message including the text input from the mobile communication device to a Text to Speech (TTS) server for conversion into an audio message and for transmission of the audio message to the addressee device associated with the identifier, wherein the TTS server transmits an acknowledge message that permits the addressee device to allow delivery of the audio message or to decline delivery of the audio message, and wherein the TTS server transmits the audio message in response to the addressee device allowing delivery of the audio message; and receive a confirmation message from the TTS server, wherein the confirmation message indicates that a reply voice message has been received from the addressee device in response to the audio message.

2. The non-transitory computer-readable storage medium of claim 1, further comprising instructions that, when executed by the processor, cause the processor to transmit a request from the mobile communication device to the TTS server to receive the reply voice message.

3. The non-transitory computer-readable storage medium of claim 2, further comprising instructions that, when executed by the processor, cause the processor to play the reply voice message at the mobile communication device in response to receipt of the reply voice message from the TTS server.

4. The non-transitory computer-readable storage medium of claim 1, wherein the confirmation message includes an email message and wherein the reply voice message is attached to the email message.

5. The non-transitory computer-readable storage medium of claim 1, further comprising instructions that, when executed by the processor, cause the processor to:
provide a repeat transmission option via the user interface in response to the addressee device not accepting or declining delivery of the audio message; and
automatically attempt one or more additional transmissions of the audio message to the addressee device in response to a selection of the repeat transmission option.

6. The non-transitory computer-readable storage medium of claim 5, wherein one or more additional transmissions are automatically attempted when the addressee device is busy, and wherein the one or more additional transmissions are automatically attempted when the addressee device is free but does not answer a call attempting delivery of the audio message.

7. The non-transitory computer-readable storage medium of claim 1, wherein the user interface further comprises a selectable input to specify a tone of voice associated with the audio message.

8. The non-transitory computer-readable storage medium of claim 1, wherein the identifier includes a telephone number, and wherein the second area is adapted to receive one or more telephone numbers.

9. The non-transitory computer-readable storage medium of claim 1, wherein the user interface further comprises a banner interface area configured to receive a selection of a pre-recorded communication, and wherein the selected pre-recorded communication is sent with the audio message.

10. The non-transitory computer-readable storage medium of claim 1, wherein the acknowledge message transmitted to the addressee device includes a vocal message requesting a telephone keypad response, wherein the telephone keypad response includes one of a first telephone keypad response to listen to the audio message and a second telephone keypad response to decline the audio message.

11. A method comprising:
receiving, at a Text to Speech (TTS) server, a short message service (SMS) message and one or more destination addresses from a mobile communication device, the SMS message including text input received at the mobile communication device;
converting the text input into an audio message;
transmitting an acknowledge message from the TTS server to the one or more destination addresses via the Internet, wherein the acknowledge message permits a destination device to allow delivery of the audio message or to decline delivery of the audio message;
transmitting the audio message from the TTS server to the one or more destination addresses via the Internet in response to the destination device accepting delivery of the audio message;
receiving, at the TTS server, a reply voice message from the destination device in response to the audio message; and
transmitting a confirmation message from the TTS server to the mobile communication device in response to receiving the reply voice message, wherein the confirmation message indicates that the reply voice message has been received at the TTS server from the destination device.

12. The method of claim 11, further comprising:
receiving a request from the mobile communication device for the reply voice message; and
transmitting the reply voice message from the TTS server to the mobile communication device in response to the request.

13. The method of claim 11, wherein the confirmation message includes an email message and wherein the reply voice message is attached to the email message.

14. The method of claim 11, wherein the SMS message further comprises a language identifier specifying a language to which the text input is to be translated, and wherein the method further comprises translating the text input from a first language to a second language before the text input is converted into the audio message.

15. The method of claim 11, wherein the SMS message received at the TTS server further includes information associated with a selection of a pre-recorded communication from a plurality of pre-recorded communications presented at the mobile communication device via a banner interface of a web site, wherein the selected pre-recorded communication is included in the audio message transmitted from the TTS server to the one or more destination addresses.

16. The method of claim 11, further comprising automatically attempting one or more additional transmissions of the audio message in response to the destination device not accepting or declining delivery of the audio message.

17. A method comprising:
providing a user interface to a display device of a mobile communication device, the user interface including a first area to receive text input and a second area to receive an identifier associated with an addressee device;
receiving the text input and the identifier via the user interface;
transmitting a short message service (SMS) message including the text input from the mobile communication device to a Text to Speech (TTS) server for conversion into an audio message and for transmission of the audio message to the addressee device associated with the identifier, wherein the TTS server transmits an acknowledge message that permits the addressee device to allow delivery of the audio message or to decline delivery of the audio message, and wherein the TTS server transmits the audio message in response to the addressee device allowing delivery of the audio message; and
receiving, at the mobile communication device, an email message from the TTS server, the email message indicating that a reply voice message has been received at the TTS server from the addressee device in response to the audio message.

18. The method of claim 17, wherein the reply voice message is attached to the email message.

19. The method of claim 17, further comprising transmitting a request from the mobile communication device to the TTS server to receive the reply voice message.

20. The method of claim 19, wherein the reply voice message is received at the TTS server in a first language and wherein the TTS server converts the reply voice message from the first language to a second language before transmission to the mobile communication device.

* * * * *